Nov. 3, 1936.  H. P. HINDS  2,059,867
METHOD OF SECURING A METAL MEMBER TO A NONMETALLIC TUBULAR MEMBER
Original Filed June 22, 1932
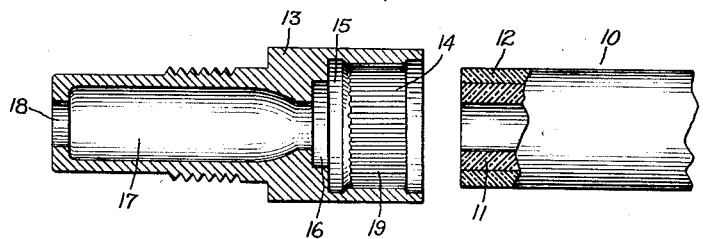
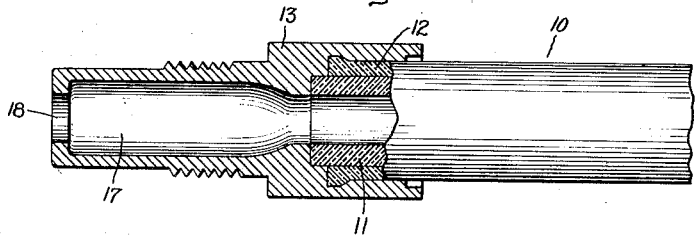
Inventor:
Henry P. Hinds,
by Chas V. Tuella
His Attorney.

UNITED STATES PATENT OFFICE 2,059,867

METHOD OF SECURING A METAL MEMBER TO A NONMETALLIC TUBULAR MEMBER

Henry P. Hinds, Providence, R. I., assignor to General Electric Company, a corporation of New York Application June 22, 1932, Serial No. 618,817

7 Claims. (Cl. 18—59)

My invention relates to an improved method of and means for securing a metal part or contact member to a fibrous tube.

In the electrical industry and frequently in other industries it becomes desirable to rigidly secure a metal member to a non-metallic member in order to take advantage of the characteristics of the particular non-metallic member where the characteristics of the metal member make it unsuitable. In the electrical industry this most frequently happens when it is necessary to insulate two metal parts from each other electrically and at the same time connect them together mechanically. When it is only necessary to separate the metal parts by a small distance to insulate for relatively low voltages the problem is generally simple but when high voltages are to be encountered and the non-metallic member is to be called upon to withstand mechanical stresses the problem may be very serious. The principal difficulty encountered is in maintaining a tight joint which is permanent and which will withstand repeated mechanical stresses. One of the characteristics of most non-metallic members which raises the difficulty of making a tight joint with a metal member is the relatively great change in dimensions with temperature or atmospheric changes as compared with the changes in metal under similar conditions. If the metal member surrounds the non-metallic member then on a rise in temperature or other atmospheric change the internal stress in the non-metallic member may cause it to fracture at the joint. Also the joint may be loosened on a fall in temperature or atmospheric change.

The object of my invention is to provide an improved method of and means for securing a contact or metal part to a non-metallic tube which will insure a tight connection between the metal contact and the tube under all normal service conditions to prevent a loosening of the contact on the tube.

In the manufacture of fuse holders, especially fuse holders for high tension circuits, this problem generally arises because it is necessary to secure metal contacts or ferrules to one or both ends of a tube of fibrous material. By fibrous material is meant paper, fabric, wood, asbestos, or other non-metallic material which has a fibrous structure. Fibrous material in addition to possessing the undesirable characteristics as mentioned in connection with non-metallic materials in general also absorbs water or moisture in large quantities which causes it to swell thus increasing the difficulty of making a tight joint between it and a metal member. A tight joint between the contact and tube is important because when a fuse blows within it high pressure gases are generated which if allowed to escape through the joint between the contact and tube would reduce the efficiency of the fuse holder and fuses of the expulsion type where the high gas pressure must be retained long enough to rapidly quench the arc which is established by the fuse blowing action and also to rapidly expel all the parts freed by the blowing of the fuse through the proper opening provided for that purpose.

What I consider to be novel and my invention will be better understood by reference to the following specification and appended claims when considered in connection with the accompanying drawing.

In the drawing, Fig. 1 is a view in side elevation, partly in section, of a contact and tube before they are secured together; Fig. 2 is a similar view in elevation with the contact and tube secured together.

In the drawing, 10 indicates a composite tube of insulating material comprising an inner solid wall tube or lining 11 of vulcanized fibrous material covered by an outer tube 12 of laminated fibrous material. The solid wall tube or lining 11 is used to obtain the arc resisting quality necessary. Outer tube 12 is formed by winding sheet material, such as cloth, paper, or the like, on the inner tube 11 as a core. The outer surface of the inner tube 11 is first roughened by abrasives or by knurling. The sheet material is covered on one side with a binder, such as shellac, synthetic resin, or the like. This sheet material is then tightly wound on the tube 11 after being passed over a heated apron to soften the binder. Pressure may be applied while the sheet material is wound on the tube 11. The outer laminated tube 12 may then be cured by the application of heat or it may be cured slowly merely by exposure to the atmosphere. In either case a contact 13 is secured to the composite tube 10 while the outer tube 12 is still in the uncured state. After the tube 12 is cured it becomes very tough and will absorb only a small amount of moisture relative to other fibrous materials. Also, it does not expand or contract very much with changes in temperature or atmospheric changes, nor will it soften when subjected to relatively high temperatures. Contact 13 is provided with an opening 14 at one end which may be the same or slightly larger in diameter than the outside diameter of the composite tube 10. This opening 14 communicates with a groove 15 of somewhat larger diameter than opening 14. Opening 14 is provided with ribs 19 on its surface. Communicating with groove 15 is a cylindrical opening 16 of the same or a slightly larger diameter than the inner tube 11. As shown in the drawing, contact 13 is provided with a chamber 17 having an opening 18 at the opposite end of the contact.

To secure the contact or metal member 13 to the tube 10, member 13 is first heated to a temperature that is sufficiently high so that when the tube 10 is inserted in it enough heat will be imparted to the outer laminated tube 12 which is in the uncured state, to soften it. The tube 10 is then placed adjacent to and in line with opening 14 of the metal member 13. When the heat applied to the metal member 13 has somewhat softened the outer laminated tube 12, pressure is applied to the contact 13 and tube 10 at the ends opposite the juxtaposed ends in a direction to force them toward each other. This pressure forces the tube 10 into opening 14 and causes the end of the outer tube 12 to slide back from the end of tube 11 permitting it to enter the smaller opening 16, the displaced end of the outer tube 12 being forced into the groove 15 between openings 14 and 16. This pressure also causes the softened outer tube 12 to extend into the spaces between ribs 19 provided on the surface of opening 14 to prevent subsequent relative rotation between the contact and tube. The continued application of heat to the metal member or contact 13 and the subsequent cooling cures and hardens the outer tube 12 which locks the tube and metal member together.

By securing the metal contact member to the tube with the outer covering of laminated sheet material, a tight joint is made between the two which is not loosened by changes in temperature and other atmospheric conditions and also the possibility of fracture of the tube by swelling of the tube due to the absorption of moisture is eliminated. In addition, by this method the joint between the metal member and the tube can be made very tight at the outset without the necessity for clearance to allow for uneven expansion and contraction of the metal and the tube. As pointed out above, the expansion and contraction with temperature and other atmospheric changes of the laminated tube is not excessive.

While I have illustrated and described my invention in connection with fuse holders for fastening a metal member to a fibrous tube, it is to be understood that this is only by way of example and that the invention is not necessarily limited thereto.

What I claim as new and desire to secure by Letters Patent of the United States is:

1. The method of securing a metal member having an opening with a groove to a composite fibrous tube which consists in forming the fibrous tube by covering a solid wall tube with laminated material, placing the fibrous tube in line with the opening in the metal member, applying heat to the metal member, applying pressure to the tube and metal member to force the tube into the opening in the metal member and expand the laminated material into the groove adjacent the opening.

2. The method of securing a metal member having an opening with a groove and a second smaller opening communicating with the first opening to a tube of fibrous material which consists in forming the tube by covering a solid wall tube with laminated material, placing the tube adjacent the first opening in the metal member, applying heat to the metal member, applying pressure to said metal member and tube to force the tube into the opening in the metal member and to cause the laminated material to slip back from the end of the solid wall lining permitting it to enter said smaller opening and causing the laminated material to extend into the groove.

3. The method of securing a metal member having an opening with a groove and a second smaller opening communicating with the first opening to a tube of fibrous material which consists in winding sheet material covered with a binder around a solid wall lining, placing the tube adjacent the first opening in the metal member, applying heat to soften the sheet material, applying pressure to the tube and metal member to force the tube into the opening to cause the sheet material to slip back from the end of the solid wall lining permitting the lining to enter said smaller opening and causing the sheet material to extend into the groove, continuing the application of heat for a short time and then cooling the metal member and tube to cure and harden the sheet material to lock the metal member to the tube.

4. The method of securing a metal member having an opening with a groove and a second smaller opening communicating with the first opening to a tube of fibrous material which consists in winding sheet material around a solid wall lining, first roughening the surface of the lining, covering the sheet material with a binder, passing the sheet material over a heated arbor and then winding it around the solid wall lining, placing the tube adjacent the first opening in the metal member, applying heat to the metal member, applying pressure to force the tube into the opening of the metal member and cause the sheet material to slip back from the end of the solid wall lining, permitting the lining to enter said smaller opening and causing the sheet material to extend into the groove, continuing the application of heat and then cooling to cure and harden the sheet material.

5. The method of securing a metal member having a recess with two communicating portions of different cross-sectional area and a circumferentially extending groove in the wall of the larger portion of the recess adjacent the smaller portion to a non-metallic tubular member the exterior of which is capable of being softened to pliable state and hardened to rigid state, which consists in rendering soft and pliable the exterior of said tubular member adjacent one end thereof, inserting said one end of the tubular member into said larger portion of the recess and into abutment with the shoulder provided by the reduction in area of the recess at the entrance to the smaller portion thereof, applying sufficient telescoping pressure to said members to cause said shoulder to strip back a portion of the softened exterior portion of the tubular member and to force the stripped back portion into locking engagement with said groove while a central cored-out portion of the tubular member is forced into the smaller portion of said recess into firm engagement with the walls thereof, and hardening said exterior portion of the tubular member to a substantially rigid state.

6. The method of securing a tubular member embodying a plastic composition adapted to be hardened to a metal member having a passage with two communicating portions of different size and a circumferentially extending recess in the wall of the larger portion adjacent the smaller portion, which consists in applying heat to soften the exterior of the tubular member adjacent one end thereof, inserting said one end of the tubular member into the larger portion of the passage and into abutment with the shoulder formed by the reduction in area of the passage at the entrance to the smaller portion thereof, applying telescoping pressure to the two members to force a central core of the tubular member into the smaller portion of the passage to thereby cause said shoulder to upset the portion of the tubular member surrounding said core and to force the upset portion into said recess, and producing hardening of said plastic composition.

7. The method of securing a metal member having a passage with two communicating portions of different size and a circumferentially extending groove in the wall of the larger portion adjacent the smaller portion to a fibrous tubular member of substantially the same size as the smaller portion of said passage, which consists in rendering said tubular member substantially rigid, forming a tight fitting covering on the exterior of said tubular member which covering consists of fibrous material bound together by a plastic composition adapted to be hardened, rendering said covering soft and pliable, inserting the end of said tubular member with its covering into the larger portion of the passage with the end of the tubular member in alignment with the smaller portion of the passage and the end of the covering in abutment with the shoulder formed by the reduction in area of the passage at the entrance to the smaller portion thereof, applying sufficient pressure to force the end of the tubular member into the smaller portion of the passage and to cause said shoulder to upset said covering thereby to effect expansion of the covering into tight engagement with the wall of the larger portion of the passage and to effect flowing of a portion of the covering into said groove, and rendering said covering hard.

HENRY P. HINDS.